Oct. 7, 1941.    G. F. HASKELL    2,257,953
TAPERED FISHING LINE AND METHOD OF MAKING
Filed May 6, 1941
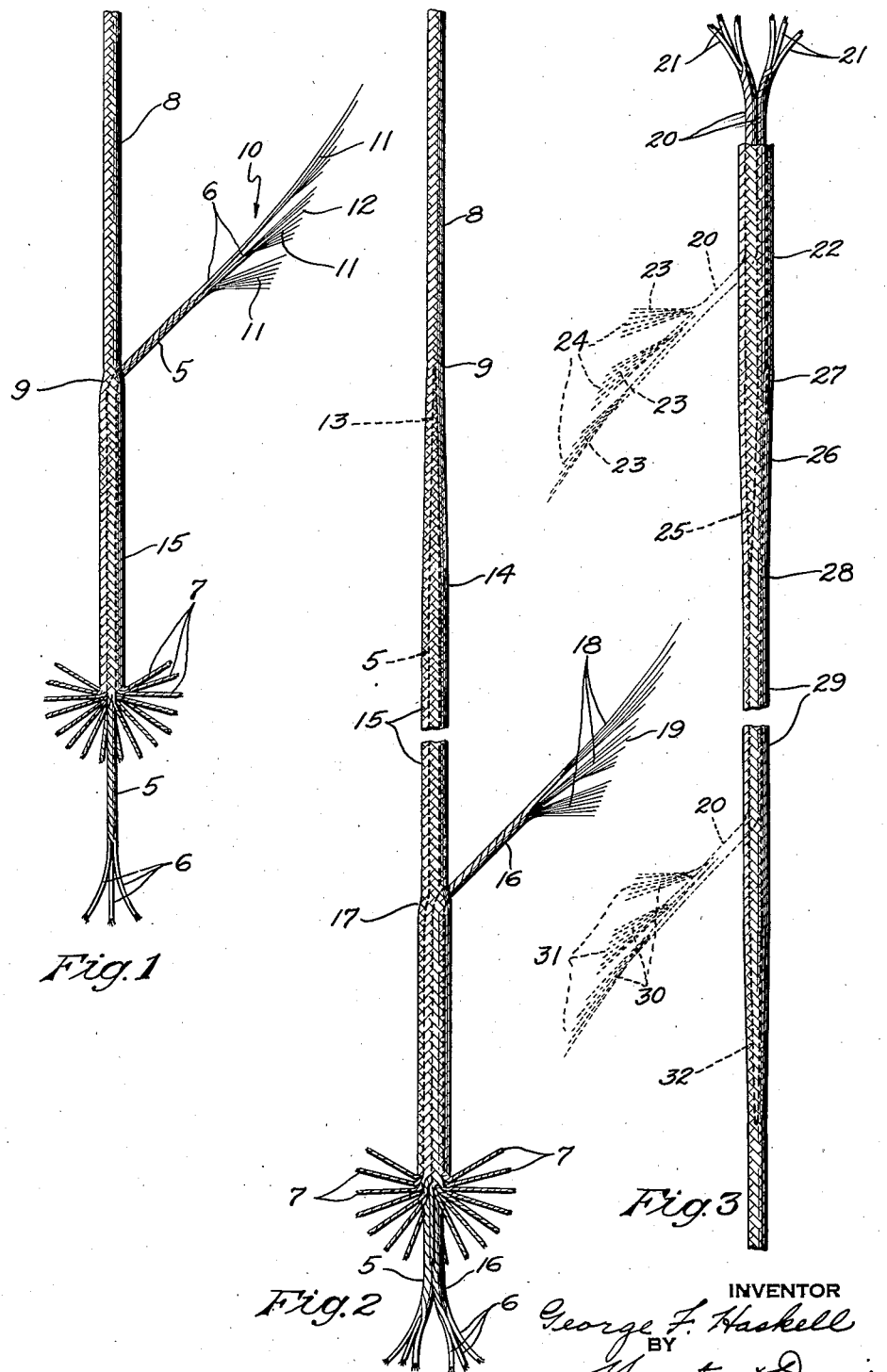

Patented Oct. 7, 1941

2,257,953

UNITED STATES PATENT OFFICE 2,257,953

TAPERED FISHING LINE AND METHOD OF MAKING

George F. Haskell, North Pharsalia, N. Y.

Application May 6, 1941, Serial No. 392,030

11 Claims. (Cl. 96—26)

This invention relates to tapered fishing lines and the method of making them, and has for an object to provide an improved method or process of manufacturing tapered fishing lines which will give a more uniform and more smoothly finished line than the present processes, and also to produce a line which has a more gradual taper, and, therefore, will not have as abrupt changes in size or diameter as present lines. Another object is to so construct and process a line that the strands of the core will not pop out or cause irregularities in the jacket, but will remain in their proper place and position in the jacket, thus giving a better and more uniform construction.

With the foregoing and other objects in view I have devised the construction illustrated in the accompanying drawing forming a part of this specification and the method of producing the same, it however being understood that I am not limited to the exact details shown and described but may use various changes and modifications within the scope of the invention.

In this drawing:

Fig. 1 is a side elevation of a portion of a fishing line on an enlarged scale illustrating how the line is constructed;

Fig. 2 is a similar side elevation showing a portion of the line finished according to Fig. 1, and also showing how the same method is carried on to complete the other portions of line; and Fig. 3 is a side elevation illustrating a modified method of making the line.

The present preferred method of making tapered lines is to use fibrous substances or materials which have been degummed or boiled off before manufacturing or processing starts, or before braiding them into the line to increase or decrease the jacket sizes to change the outside diametric size, and it has been found that the splices caused in increasing or decreasing the outside size or jacket of the line will pop out or come through, or the ends of the core strands will break through the jacket because they cannot be held in place.

In my improved method it is preferred to braid the jacket about the core while the fibrous material, such for example as silk, flax or other suitable material is in the raw state and not degummed and then adding or taking away. It is, however, not limited to use with fibrous materials in the undegummed state, but may be used with other materials, such for example as "nylon," and other or similar materials.

In my invention the preferred method is to braid the line with raw material which has not been degummed, such for example as raw gum silk, raw "nylon," flax fiber and other suitable materials, to form or braid a continuous jacket around various strands of core stock of such raw undegummed material, and to add or take away additional strands of said core stock in such a manner as to prevent popping out of the ends of the strands through the jacket and to give the jacket a gradual taper instead of an abrupt change in size. One method of changing the size of core is to pull in the strands of the core stock with one end of the individual strands extending out through the side of the jacket, this free end being frayed and then cut at an incline or on a bias so that the resulting frayed end is tapered, and thus when drawn into the jacket and the braiding is completed this end cannot pop out of the jacket and gives a more gradual and not so abrupt taper or change in size of the line. Another modification is to braid the jacket for the desired distance about the core or core stock of the largest number of strands which is to be used in the given line, and then at the desired point to fray out the free end of one or more strands, then to cut the frayed end on an incline or bias to form a tapered end and continue braiding the jacket onto the remaining core stock, and at desired intervals removing one or more other strands by fraying and so cutting their free ends in the same manner, and so on throughout the completed line.

The method and the completed line is illustrated more clearly and specifically in the accompanying drawing which is on a greatly enlarged scale for clearer illustration. Referring first to Figs. 1 and 2, Fig. 1 shows merely by way of example how a core of a single thread or strand is drawn into the jacket, although this single core member may be made up of one or more strands. In the illustration this core member indicated at 5 is made up of a plurality of strands 6, three in number, although as indicated any desired number of one or more may be employed. The jacket braided about this core may be of any desired number of threads 7 leading from the bobbins of any standard braiding machine capable of braiding ordinarily anywhere from 8 to 48 threads which is the usual practice. In braiding the line the jacket may be braided at 8 for any suitable distance to give a portion of the smallest diameter of the line, which of course will depend on the number and size of threads used. At the point 9 where it is desired to increase the diameter of the line one or more core threads or strands 5 is drawn into the jacket with the free end portion 10 extending through the side of the jacket, and the jacket is braided for a short distance about this core. The free end of this protruding thread or strand is untwisted and frayed as indicated at 11, and then it is cut on an incline or bias as shown at 12 with the result that the end comprising the end of separated fibers is tapered. Then this core is drawn into the jacket as indicated at 13 in Fig. 2, and the braiding of the jacket around this core is continued. It will be seen from Fig. 2 that from about the point 9 to about the point 14 comprising the taper of the core the jacket will be correspondingly tapered and therefore the change in size of the line or jacket will be gradual instead of abrupt as would be the case if the core were cut straight across.

The braiding of the jacket from the point 14 is continued as shown at 15 for the desired distance, and then one or more additional core threads or strands 16 are added at the point 17 in the same manner, the jacket being braided for a short distance about the core with the additional strands to hold it, the ends frayed as indicated at 18 and cut on an incline or bias as indicated at 19, and then drawn into the jacket and the braiding of the jacket about the core being continued. The number of points at which the additional core strands are added is continued as desired depending on the length and size of the line and the number of changes in diameter desired, but in each case because of the tapered frayed end or ends of core strands, the change in diameter of the line or jacket in each case is a gradual taper or change in size.

Because of this frayed end cut on a taper the strands will not pop out through the sides of the jacket during the braiding and finishing operations, and this danger is still further decreased by using raw gum material or material which has not been degummed as the stock for either the core or the braided jacket, the gums assisting in retaining the free ends of the core strands within the jacket. The core strands thus stay in place during the remainder of the operation of manufacturing or processing, leaving a smooth line with no roughness caused by the splices or free ends popping out.

In the modification shown in Fig. 3 is illustrated how the process can be carried out by braiding the largest part of the line, or the part having the largest diameter, first and then gradually decreasing the size of the core and thus the size of the line by removing one or more of the strands of the core at the desired points throughout the length of the line where the change in size is desired. For the purposes of illustration the core is shown as comprising two threads 20 of three strands 21 each. This is used merely by way of example, as any number of core threads or strands desired may be used. The jacket is braided about this core for the desired distance as indicated at 22 and at the point where it is desired to reduce the diameter of the line one or more of the core threads or strands is cut and the end frayed out as indicated by the dotted lines at 23, and the frayed end cut on an incline or bias at 24 the same as described in connection with Figs. 1 and 2. The braiding of the jacket is then continued, and this tapered end, braided as indicated at 25, gives a tapered portion 26 to the jacket corresponding to the taper on the end of the core strand, that illustrated being from about the point 27 to about the point 28. Then the braiding of the jacket is continued as indicated at 29 for the desired distance to a point where it is again desired to reduce the diameter of the line, when the ends of one or more other strands are frayed and cut on an incline as indicated at 30 and 31 and then braided into the jacket as indicated at 32 for a gradual and tapered change in the size of the line, and so on throughout the full length of the line.

In either case the single or multiple strands of fibrous material, preferably not degummed but in the raw gum state, such for example as raw gum silk, or other materials of like or similar character, or raw "nylon," or of any suitable material, may be introduced into the line to increase the size at the desired intervals or removed to decrease the size at the desired intervals, and preferably the jacket is also braided of the raw or undegummed material, and the core strands may be added or removed in any desired multiples at any point or points desired to give the proper required taper or change in size of the line, and each change will be gradual or have a gradual taper instead of having the objectionable abrupt change. It will be understood that the angle of the inclined cut or bias will be smaller or larger depending on the abruptness or rate of change and therefore the length of the taper desired at the point of change of the size of the line.

After the braiding of the lines they may then be degummed or boiled off by placing them either individually or by skeins in degumming solutions, usually consisting of softened water and suitable degumming soaps which have been heated together, in a similar manner as that used and common with the silk industry. The line or lines are allowed to remain in this heated degumming solution for a period of approximately three to six hours depending on the sizes of the lines and the number of lines in the skein. At the end of the allotted time the gum in the material of the line has been softened to the extent that the line or lines may then be rinsed in several clear luke-warm waters until all possible gums and soaps and foreign substances are removed from the lines. The lines are then dried either by forced drying or by natural drying, and are then in a condition suitable for the application of whatever finishing substances or surfaces are desired, such for example as finishing oils or other suitable materials.

Having thus set forth the nature of my invention what I claim is:

1. A method of making a tapered fishing line comprising braiding a jacket for a portion of a line, pulling in a strand for a core with one end extending outwardly through a side of the jacket, fraying said end and cutting it diagonally to form a tapered end, then drawing the frayed end into the jacket, and continuing braiding of the jacket about the core.

2. A method of making tapered fishing line comprising braiding a jacket about a core of a plurality of strands of different lengths, and cutting the ends of the strands on a bias so that they are tapered to give a taper to the jacket at the points where the number of strands in the core changes.

3. A method of making a tapered fishing line comprising providing a core of a plurality of strands of different lengths, fraying the ends of the strands and cutting them on a bias so that the frayed ends are tapered, and braiding a jacket about the strands and frayed ends so that the jacket is tapered at the tapered ends where the number of strands in the core changes.

4. A method of making a tapered fishing line comprising braiding a jacket about a core made up of a plurality of strands, fraying an end of different strands at different points along the core and cutting the frayed ends on a bias, enclosing the cut frayed ends in the jacket and continuing braiding the jacket on the portions of the core beyond the cut ends.

5. A method of making a tapering fishing line comprising fraying the end of a strand of a core and cutting said frayed end on a bias, and braiding a jacket about said core to extend in both directions beyond said tapered frayed end so that the portion of the jacket covering said end is tapered.

6. A method of making a tapering fishing line comprising braiding a jacket about a core comprising a plurality of strands, at a desired location fraying the free end of a strand and cutting the free end on a bias, and then continuing braiding the jacket about said cut end and the reduced portion of the core.

7. A method of making a tapered fishing line comprising braiding a jacket about a core comprising a plurality of strands, at spaced points along the core fraying a free end of one or more strands and cutting the frayed ends on a bias so that the cut ends are tapered, and braiding the jacket over the cut ends and the portions of the core between said ends.

8. A method of making a tapered fishing line comprising fraying the end of a strand of raw gum fibrous material forming a core and cutting said frayed end on a bias, braiding a jacket about said core of a plurality of threads of raw gum fibrous material to extend in both directions beyond said tapered frayed end so that the portion of the jacket covering said end is tapered, and degumming the finished line by treating it with a degumming solution.

9. A method of making a tapered fishing line comprising braiding a jacket of raw gum fibrous material about a core made up of a plurality of strands of raw gum fibrous material, fraying an end of different strands at different points along the core and cutting the frayed ends on a bias, enclosing the cut frayed ends in the jacket and continuing the braiding of the jacket beyond the cut ends, and degumming the material by treating the completed line in a degumming solution.

10. A tapered fishing line comprising a braided fibrous jacket enclosing a core of at least one strand of fibrous material of less length than the jacket with the free end enclosed in the jacket frayed and cut on a bias so that the cut free end is tapered and the portion of the jacket enclosing said end is also tapered.

11. A tapered fishing line comprising a core of a plurality of strands of different lengths, a braided jacket enclosing said core, and the free ends of the strands within the core being frayed and cut on a bias so that the ends are tapered and the portions of the jacket enclosing said ends at the points where the number of strands in the core changes are also tapered.

GEORGE F. HASKELL.